(12) United States Patent
Turner, II

(10) Patent No.: US 6,371,505 B1
(45) Date of Patent: Apr. 16, 2002

(54) DOUBLE GOOSENECK TRAILER

(76) Inventor: Jack E. Turner, II, 1606 Guilford, Oklahoma City, OK (US) 73120

( * ) Notice: Subject to any disclaimer, the term of this patent is extended or adjusted under 35 U.S.C. 154(b) by 0 days.

(21) Appl. No.: 09/705,364

(22) Filed: Nov. 3, 2000

(51) Int. Cl.$^7$ .......................... B60P 3/022; B62D 53/06
(52) U.S. Cl. ............................... 280/441.2; 280/441.1; 280/404; 280/408; 280/425.2
(58) Field of Search ........................... 280/441.1, 441.2, 280/404, 405.1, 407, 407.1, 408, 410, 411.1, 412, 425.2, 476.1

(56) References Cited

U.S. PATENT DOCUMENTS

| | | | |
|---|---|---|---|
| 2,066,836 A | | 1/1937 | Hughes |
| 3,151,884 A | | 10/1964 | Felburn |
| 3,536,340 A | * | 10/1970 | Talbert .................... 280/441.2 |
| 4,262,923 A | | 4/1981 | Weir |
| 4,423,885 A | * | 1/1984 | Camey et al. ........... 280/441.2 |
| 4,513,987 A | * | 4/1985 | Whitaker ................. 280/441.2 |
| 4,943,078 A | | 7/1990 | McGhie et al. |
| 5,005,851 A | * | 4/1991 | McGhie et al. .......... 280/407.1 |
| 5,040,815 A | | 8/1991 | Evans |
| 5,112,073 A | | 5/1992 | McGhie et al. |
| 5,280,939 A | * | 1/1994 | Kee et al. ................ 280/411.1 |
| 5,415,425 A | * | 5/1995 | Zerbe et al. ............. 280/441.2 |
| 5,797,615 A | | 8/1998 | Murray |

* cited by examiner

Primary Examiner—Brian L. Johnson
Assistant Examiner—Matthew Luby

(57) ABSTRACT

A double gooseneck trailer for hauling large, heavy loads wherein there is provided: a jeep having a connector for connecting the jeep to a hitch on a tractor and a first hitch; a dolly having a second hitch and a plurality of axles; and a load unit having a removable front gooseneck with a connector for releasably attaching the load unit to the first hitch, a removable rear gooseneck for releasably attaching the load unit to the second hitch, and a plurality of steerable wheel assemblies, each wheel assembly including a suspension hydraulic cylinder in communication with a hydraulic cylinder on either the front gooseneck or the rear gooseneck such that a portion of a load placed on the load unit will be distributed between the wheel assemblies and the goosenecks.

13 Claims, 11 Drawing Sheets

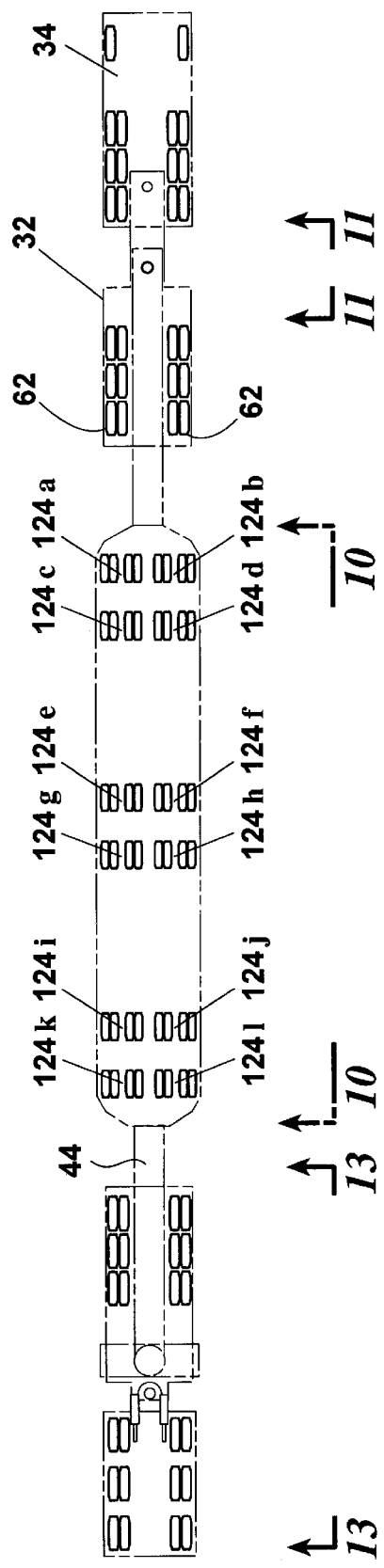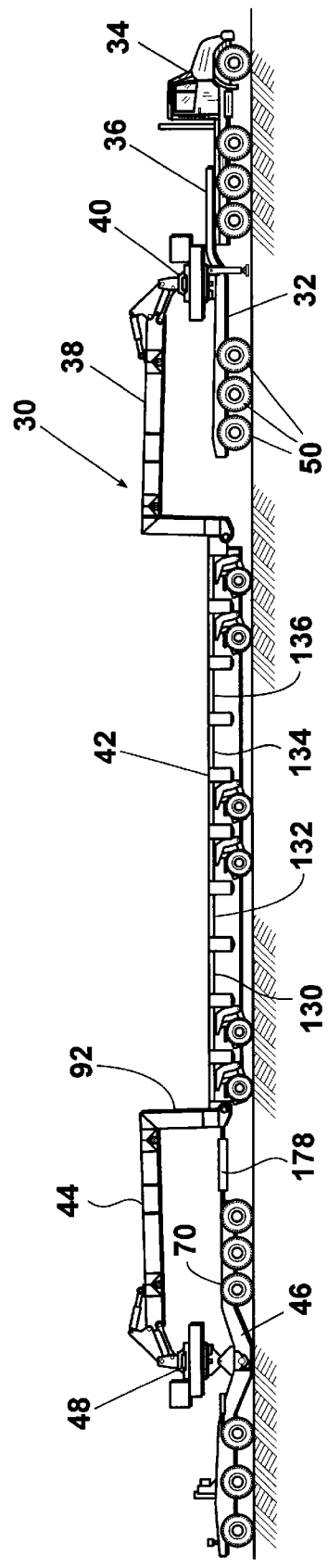

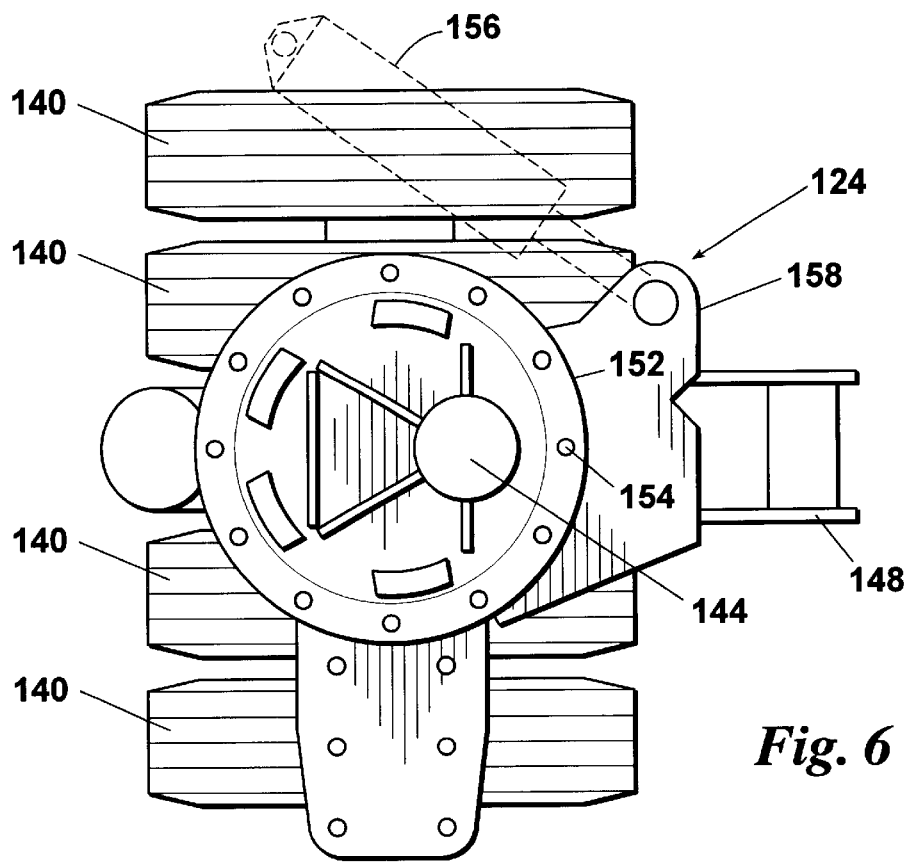
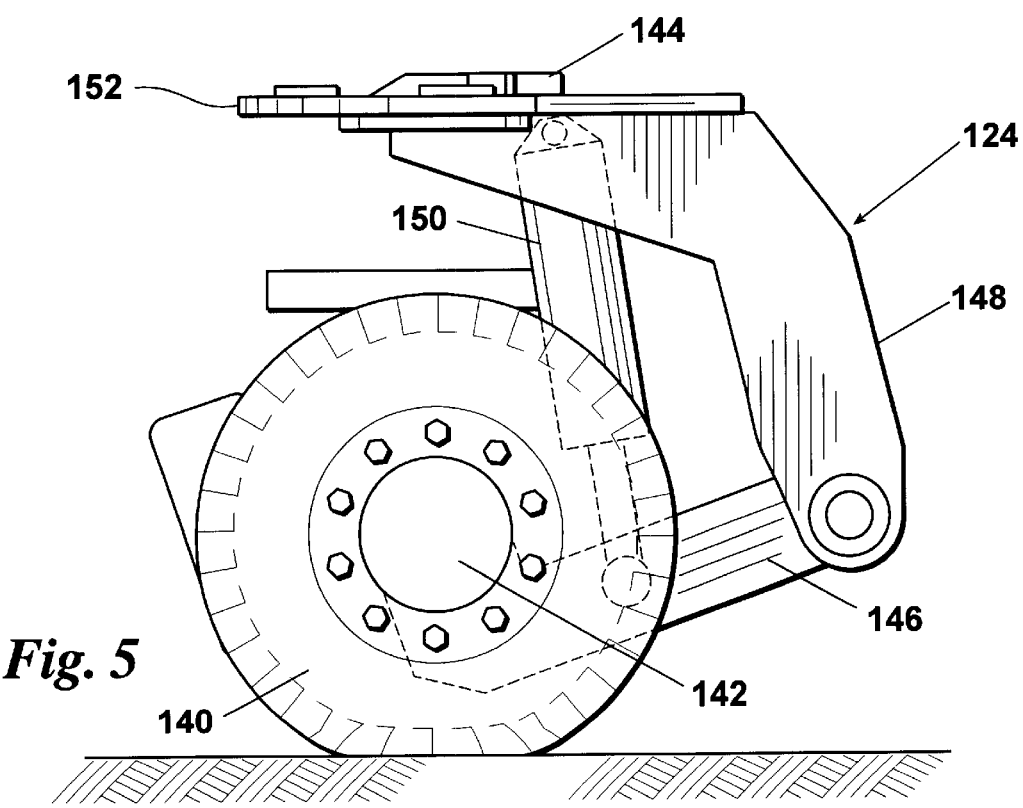
*Fig. 6*
*Fig. 5*

DOUBLE GOOSENECK TRAILER

BACKGROUND OF THE INVENTION

1. Field of the Invention

The present invention relates to trailers for hauling large, heavy loads. More particularly, but not by way of limitation, the present invention relates to a double gooseneck trailer which includes front and rear goosenecks pivotally connected to a front jeep and a rear dolly, respectively. Hydraulic cylinders automatically proportionateley shift weight from load unit axles to jeep axles for improved weight distribution. Steerable wheel assemblies, an articulated dolly, and a plurality of fifth wheel connections act in concert to achieve an improved turning radius.

2. Background

Trailers for hauling large, heavy loads are generally known in the prior art. Features have evolved to: improve the weight distribution of the load among the several axles, especially in relation to regulations which vary from state-to-state; improve the turning radius of the entire vehicle; facilitate loading and unloading; and improve off-road terrain clearance.

For example, U.S. Pat. No. 4,943,078 issued to McGhie et al. discloses a load unit disposed between a front carriage and a rear carriage, suspended thereto by front and rear goosenecks, respectively. A front carriage connects to a jeep which, in turn, connects to a tractor. The load is evenly distributed among the axles of the front and rear carriages by a hydraulic suspension system. At least some of the wheel units are articulated for steering to improve maneuverability. The apparatus described by the McGhie '078 patent is intended for use on conventional roadways.

Further advances in a load hauling apparatus are disclosed in U.S. Pat. No. 5,112,073 issued to McGhie et al. The McGhie '073 patent discloses a load supporting dolly including a steering system for attachment to a load or load unit. The McGhie '073 patent does not provide controlled load sharing between the dolly and the carriages.

However, existing trailers for large, heavy loads still suffer from a number of limitations, particularly in regard to conforming to varying regulations along a route, accommodating off-road use, and maneuverability. All of these limitations are related to the general lack of configurability associated with prior art devices.

A limitation of prior art devices has been the inability to shift the relative load between axles on a load unit and axles on the front and rear jeeps, or carriages. This is of particular importance where weight may be credited differently to individual axles between jurisdictions. For example, a carriage may be configured with four-wheel axles while the load unit may be configured with multiple axles in a side-by-side configuration for eight wheel lines or even sixteen wheel lines. If a particular jurisdiction allows greater loads on an eight wheel line than on a four wheel line, it would be advantageous to allow distribution of the load to place a higher percentage of the load on the eight-wheel line. Also of concern is the number of axles in an axle group and the distance between such groups. These factors likewise play a role in the maximum weight transportable on a trailer in any given jurisdiction.

For the purposes of this application, the term "line" refers to a line across the trailer, perpendicular to the trailer's longitudinal axis, along which wheels are located. Thus, a line could be a single four wheel axle or any number of side-by-side axles.

Another limitation of prior art devices is that, once loaded, the weight distribution is fixed among the various axles. At best, the weight could be evenly distributed across all of the axles or lines. In order to accommodate differing regulations, a trailer has to be loaded for compliance with the most restrictive jurisdiction. This task may be quite complex as a host of factors comes in to play, i.e., the number of wheels on each axle, the number of axles in a group of axles, the distance between particular axles, and the distribution of the load on the trailer. Regulations are typically the limiting factor in determining the maximum load for a given trailer. Thus, a trailer which is easily configured to adapt to varying regulations will likely be able to haul larger, heavier loads.

Yet another limitation of prior art devices is their limited application for off-road use. Even in light of steerable axles on the carriages and the use of a steerable dolly, the maneuverability of prior art devices is limited. As the overall length of the entire vehicle approaches 200 feet, maneuvering such a vehicle into place at a job site often presents a major hurdle. However, in off-road applications, the distribution of the weight is not controlled by regulation and thus, overall length of the vehicle and maneuverability may be of greater concern than weight loading on a particular axle.

It is thus an object of the present invention to provide a trailer for hauling large, heavy loads which may be readily configured to distribute weight between truck axles, carriage axles, and load unit axles, as desired.

It is a further object of the present invention to provide a trailer for hauling large, heavy loads in which the load weight may readily be redistributed between truck axles, carriage axles, and load unit axles as the load is hauled from jurisdiction-to-jurisdiction.

It is yet a further object of the present invention to provide a trailer for hauling large, heavy loads which is separately configurable for use on roadways or for off-road use. Such configuration may be changed without unloading the trailer.

It is still a further object of the present invention to provide a trailer for hauling large, heavy loads with an improved turning radius over prior art trailers for hauling comparable loads.

SUMMARY OF THE INVENTION

The present invention provides a trailer for hauling large, heavy loads which satisfies the needs and alleviates the problems mentioned above. The inventive trailer comprises a front jeep, a load unit, and an articulated rear dolly. A hydraulic suspension system and hydraulically actuated goosenecks allow precise, proportionate distribution of the load across groups of axles. Thus, the weight of the load may be proportionately distributed among various groups of axles to facilitate compliance with local regulations. In one embodiment, valves allow rapid changing of the ratio of the load carried by each gooseneck, relative to the load unit.

Steerable wheel assemblies on the load unit operate in conjunction with fifth wheel connections between the tractor and the front jeep, between the front jeep and the load unit, and between the load unit and the dolly and with an articulated joint in the dolly to provide an improved turning radius particularly for maneuvering on or near roadways.

For off-road use, the rear gooseneck may be removed along with the front jeep and rear dolly to improve maneuverability for off-road hauling. In this configuration, the overall length of the trailer is substantially shortened, thereby providing better maneuverability.

Finally, the goosenecks may also be removed for loading and unloading to provide better access to the load unit and the load.

Thus, an aspect of the present invention is the degree to which the trailer is configurable, allowing it to easily adapt to varying regulations from state-to-state. For example, axles may be grouped under the load unit in single axle groups, tandem groups, triple groups, quad groups, etc. The inventive gooseneck allows the load to be shifted between axle groups under the load unit and the fifth wheels such that the trailer may readily be configured for low axle loads under the loading surface and high fifth wheel loads, high axle loads and low fifth wheel loads, or any point in between.

Another example of the configurability of the present invention is the self steer feature of the axles under the load unit. The axle group may be configured to provide a selectable degree of steering, no steering, or even counter steering (turning the wheels opposite the direction of a turn) to achieve a desired level of maneuverability.

Further objects, features, and advantages of the present invention will be apparent to those skilled in the art upon examining the accompanying drawings and upon reading the following description of the preferred embodiments.

BRIEF DESCRIPTION OF THE DRAWINGS

FIG. 1 provides an elevational view of the right side of a vehicle incorporating the inventive trailer shown in its general environment.

FIG. 2 provides a top plan view of a vehicle incorporating the inventive trailer showing the wheel locations when traveling in a straight path.

FIG. 5 provides a side elevational view of a steerable wheel assembly as incorporated on the inventive load unit.

FIG. 6 provides a top view of a steerable wheel assembly as incorporated on the inventive load unit.

DESCRIPTION OF THE PREFERRED EMBODIMENTS

Figure 3:
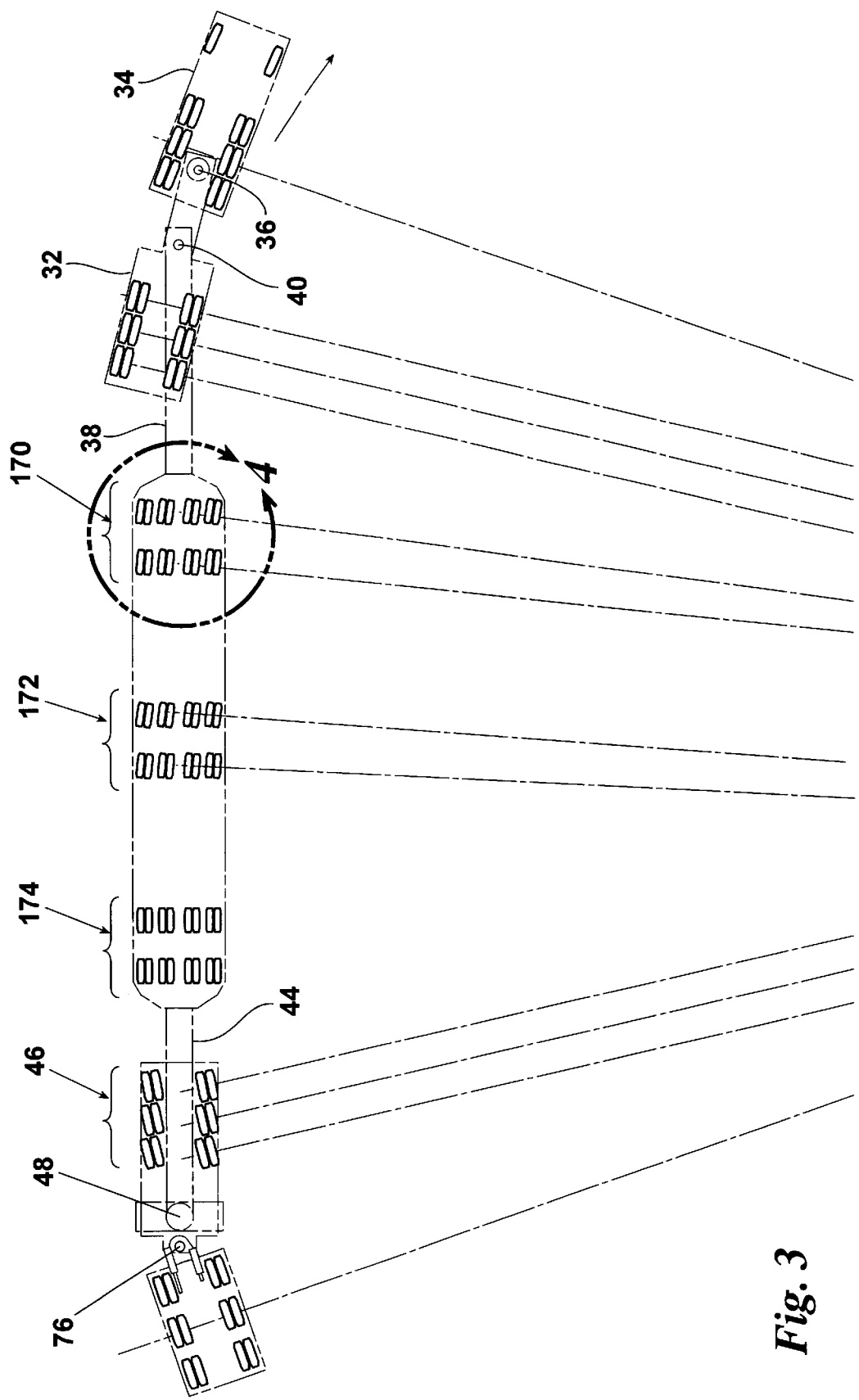
FIG. 3 provides a top plan view of a vehicle incorporating the inventive trailer showing the wheel locations while making a right turn.

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Referring now to the drawings, wherein like reference numerals indicate the same parts throughout the several views, a preferred embodiment of the inventive trailer for hauling large, heavy loads 30 is shown in its on-road configuration in FIG. 1. Preferably, trailer 30 comprises: front jeep 32 pivotally attached to tractor 34 at hitch 36; front gooseneck 38 pivotally attached to front jeep 32 at fifth wheel hitch 40; load unit 42 disposed between front gooseneck 38 and rear gooseneck 44; rear gooseneck 44 pivotally attached to dolly 46 at fifth wheel hitch 48; and articulated rear dolly 46.

Terms of direction, i.e. front, rear, left, right, etc are used to denote directions or positions in reference to a driver of tractor 34. Thus the terms "front" or "forward" is used to describe features located toward the tractor 34 while "rear" or "rearward" is used to describe features located away from tractor 34. Furthermore, the term "line" as used herein, refers to a line across the trailer, perpendicular to the longitudinal axis of the trailer, along which wheels are located. Thus, a line may be a single axle or a group of axles in a side-by-side configuration.

Figure 12:
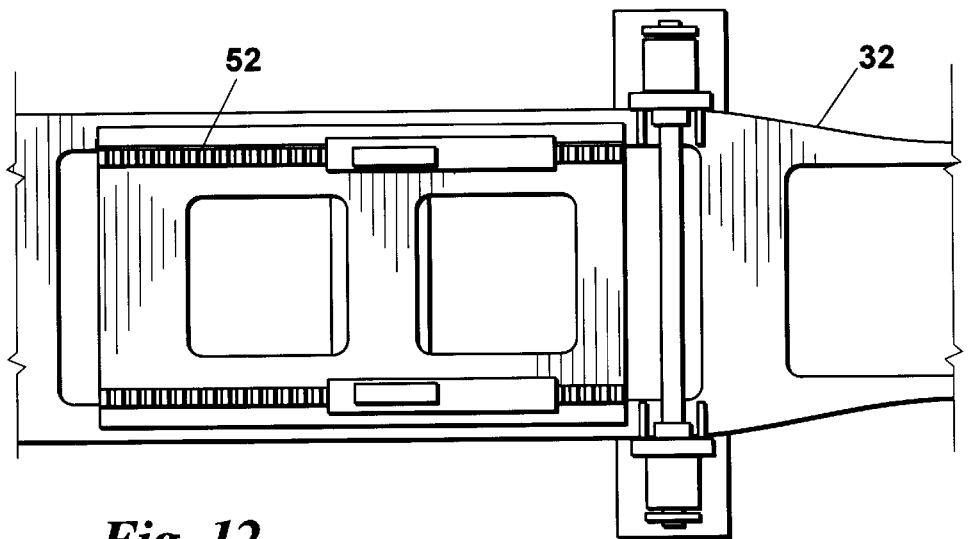
FIG. 12 provides a cutaway top view of the front jeep along line 12 of FIG. 11 showing the adjustment rack for the jeep fifth wheel mount.
Figure 11:
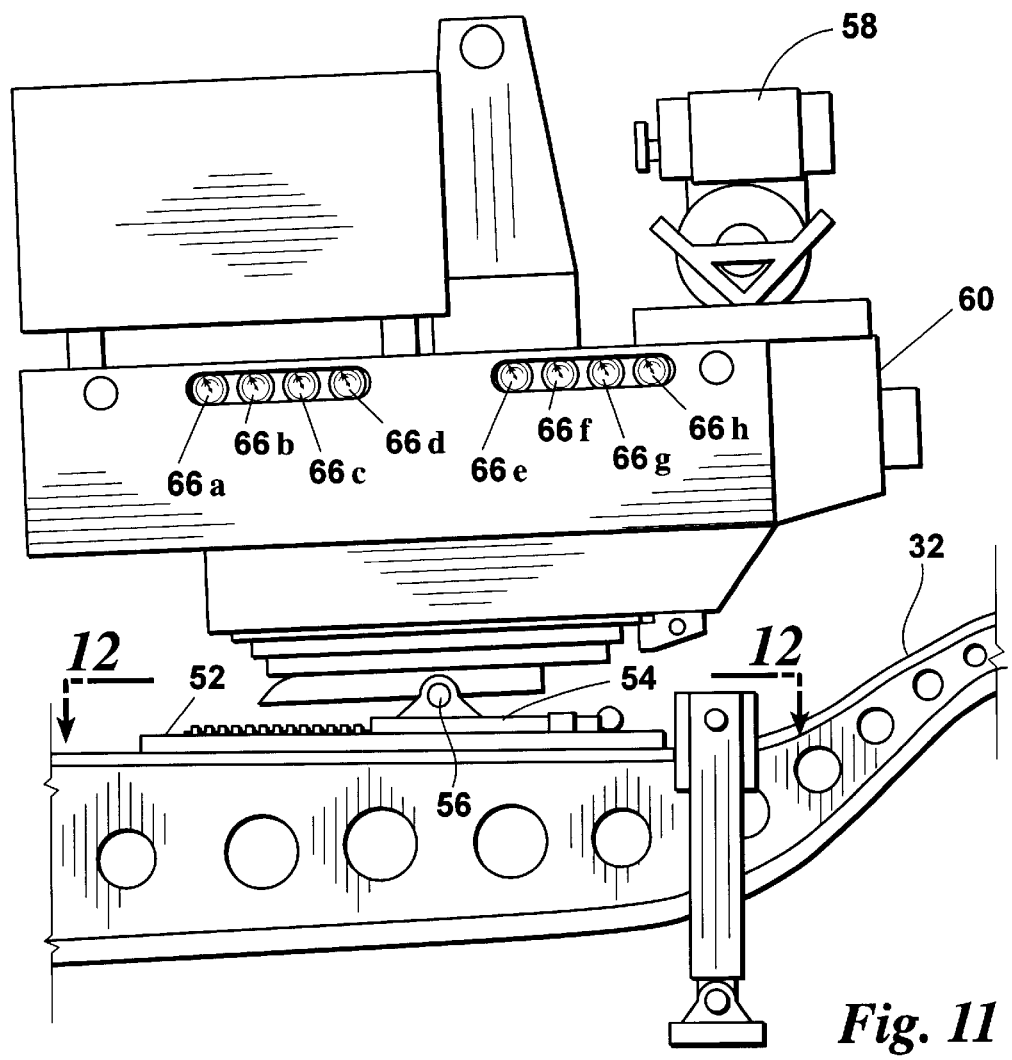
FIG. 11 provides a cutaway side view of the front jeep along line 11 of FIG. 2.

Referring now to FIGS. 1 and 2, front jeep 32 preferably includes three axles 50, each axle 50 having four wheels rotatably mounted thereon. It should be noted that any number of axles 50 could be used under jeep 32 and, furthermore, each axle could incorporate any appropriate number of wheels 51 thereon, four and eight wheel configurations being typical. Jeep 32 pivotally attaches to tractor 34 with a conventional fifth wheel hitch 36 allowing articulated movement between tractor 34 and jeep 32 during turning. As best seen in FIGS. 11 and 12, front jeep 32 includes rack 52 in lockable sliding engagement with mount 54 whereby the mount 54 may be selectively positioned longitudinally along jeep 32 to distribute the weight supported by front gooseneck 38 between tractor 34 and axles 50. Mount 54 includes: pivot 56 such that the pitch angle between jeep 32 and gooseneck 38 is free to vary in response to uneven terrain as the trailer 30 traverses a roadway; and fifth wheel hitch 40 whereby gooseneck 38 is removably connected to jeep 32.

Preferably, jeep 32 further includes hydraulic power unit 58 affixed to enclosure 60 and gauges 66a–h housed in enclosure 60 for monitoring the hydraulic pressure of the suspension system discussed in more detail hereinbelow.

Figure 14:
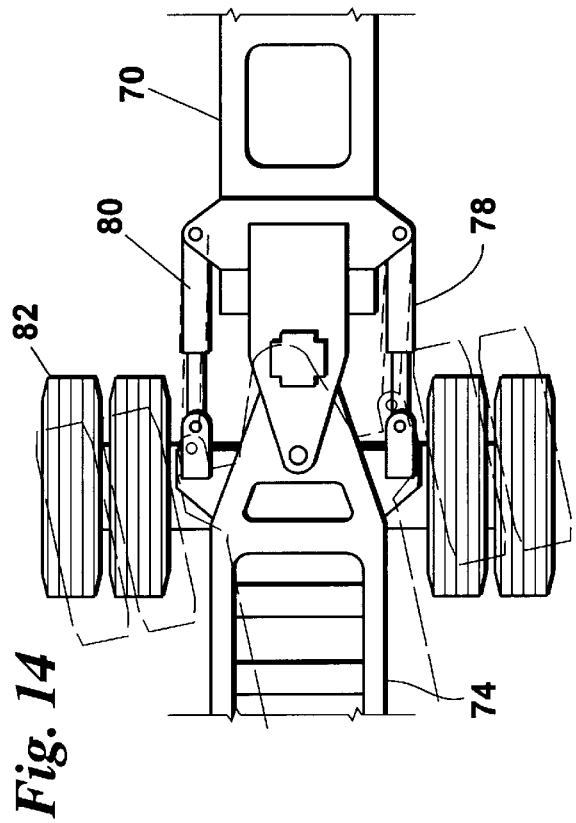
FIG. 14 provides a cutaway top view of the dolly along line 14 of FIG. 13 showing the steerable joint incorporated therein.
Figure 13:
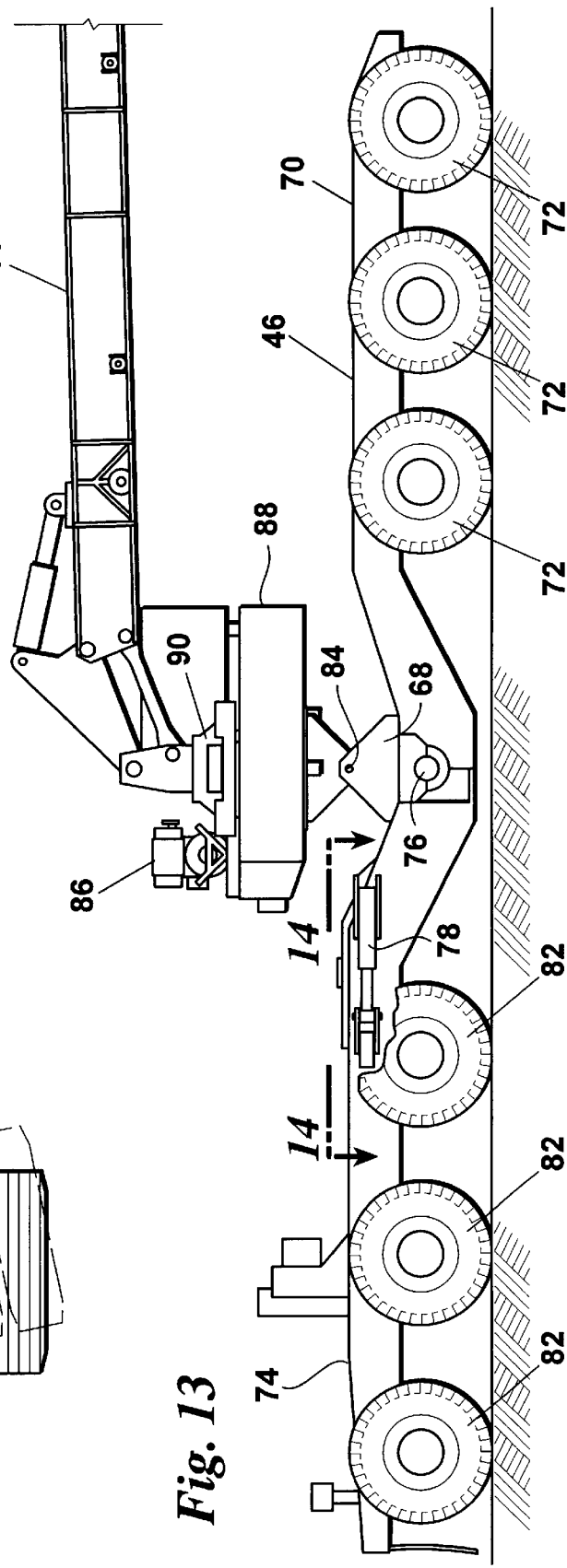
FIG. 13 provides a cutaway side view of the rear dolly along line 13 of FIG. 2.

Referring next to FIGS. 13 and 14, rear dolly 46 includes front section 70 pivotally attached to rear section 74 at articulated joint 76. Preferably each section 70 and 74 has three, four-wheel axles 72 and 82, respectively. The pivoting of joint 76 is controlled by hydraulic cylinders 78 and 80 which may be actuated by a self-steer mechanism as is known in the art. Mount 68 includes pivot 84 to allow the pitch angle between dolly 46 and gooseneck 44 to vary in response to uneven terrain, and fifth wheel hitch 90 for removably attaching gooseneck 44. Dolly 46 further includes hydraulic power unit 86 attached to enclosure 88, and gauges (not shown) housed in enclosure 88 for monitoring the hydraulic pressure of the suspension system discussed in more detail hereinbelow.

As with jeep 32, dolly 46 could be provided with any number of axles 72 and 82 under the front section 70 and the rear section 74, respectively. Each axle 72 and 82 could be provided with any number of wheels 73 as appropriate.

It will be apparent to those skilled in the art that hydraulic power supplied by hydraulic power unit 86 could instead be supplied by hydraulic power unit 58, or alternatively, if tractor 34 was equipped with a hydraulic pump of sufficient capacity, neither hydraulic power unit 58 or 86 would be necessary.

Figure 8:
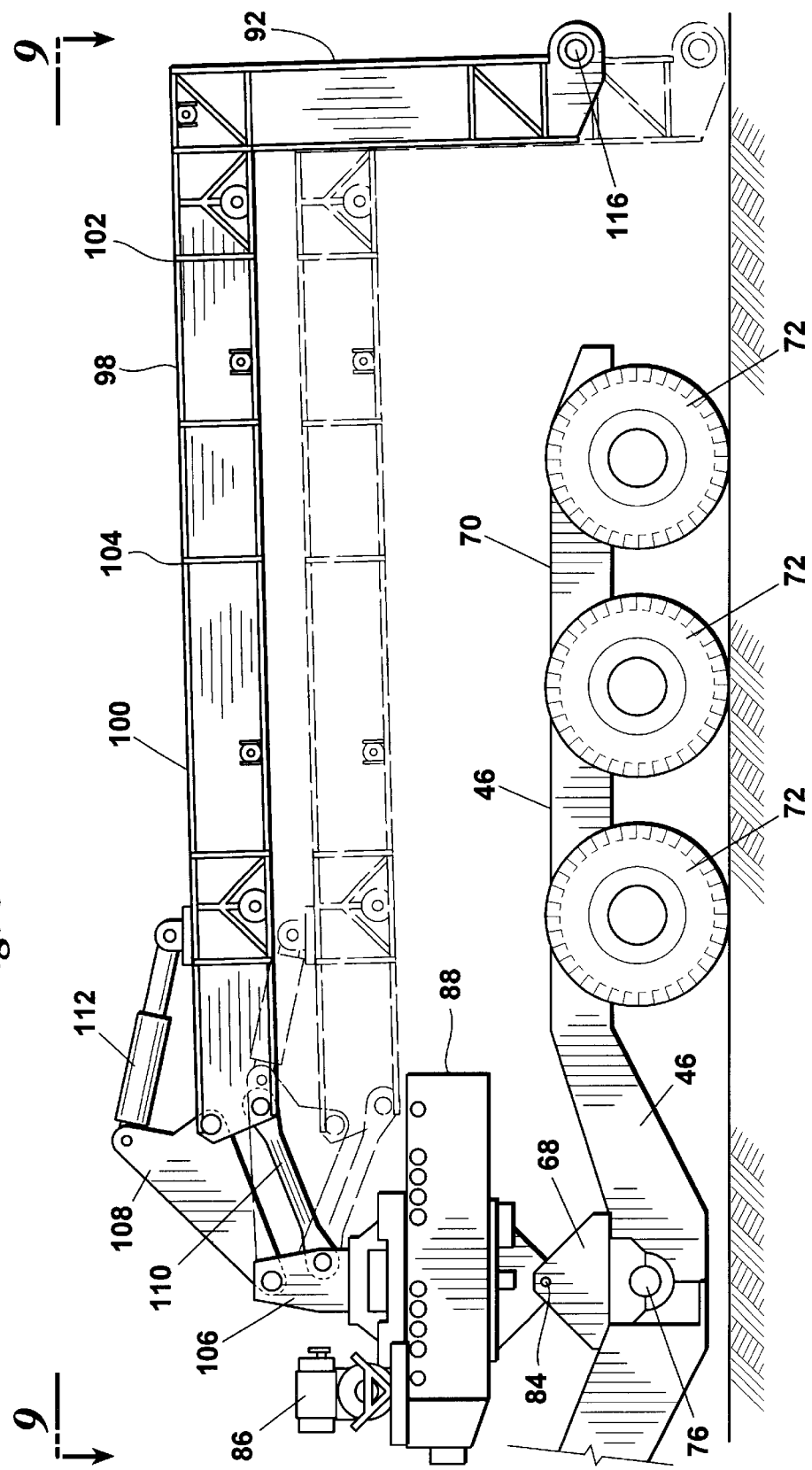
FIG. 8 provides an elevational view of the right side of the rear gooseneck as incorporated on the inventive trailer.
Figure 9:
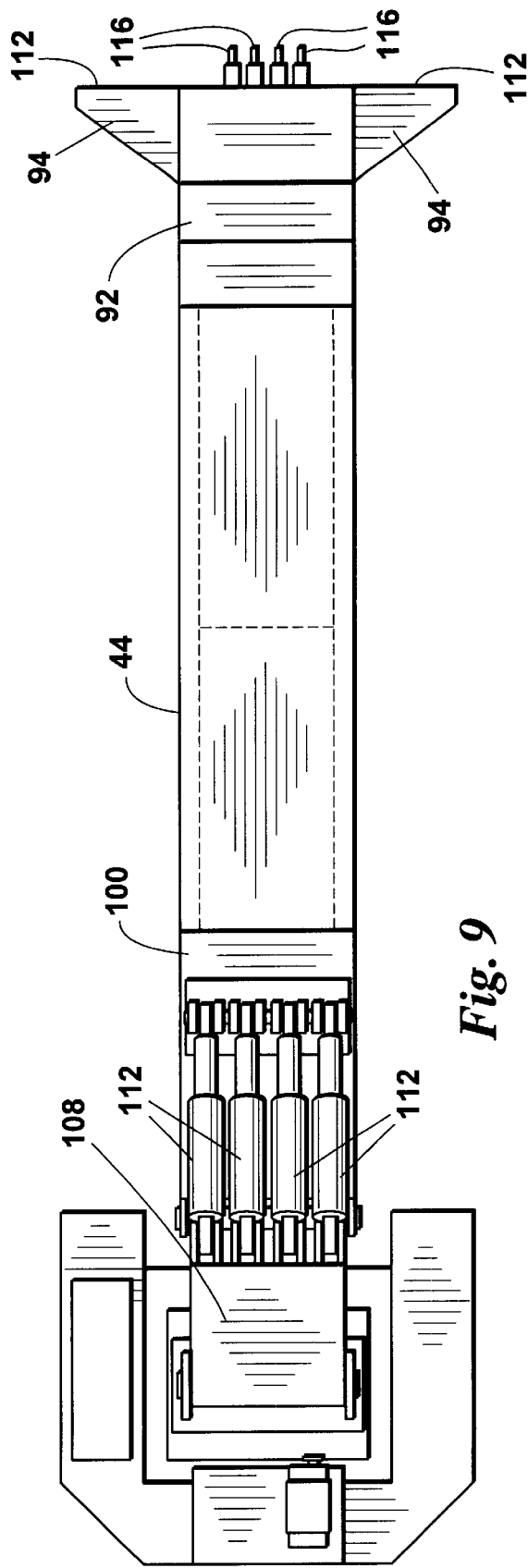
FIG. 9 provides a cutaway top view of the rear gooseneck along line 9 of FIG. 8

It should be noted that, in the preferred embodiment, front and rear goosenecks 38 and 44 are identical assemblies and any discussion as to either gooseneck 38 or 44 is applicable to the other as well. Turning now to FIGS. 8 and 9, rear gooseneck 44 comprises: vertical section 92 having flange 94 at a lower end 96 for attaching gooseneck 44 to load unit 42; horizontal extension 98 connected to vertical section 92 at an inboard end 102 and connected to outboard beam 100 at an outboard end 104; and outboard beam 100 attached to hitch connector 106 with top link 108 and bottom link 110. Hydraulic cylinders 112 are operably disposed between top link 108 and beam 100. It will be apparent to those skilled in the art that hitch connector 106, top link 108, bottom link 110, and outboard beam 100 form a four bar mechanism, each link 108 and 110 being pivotally attached to both the hitch connector 106 and the outboard beam 100 such that the relative angle between connector 106 and beam 100 will be substantially constant regardless of the height of beam 100 relative to connector 106. As hydraulic cylinders 112 are extended, gooseneck 44 is raised relative to hitch connector 106 and, conversely, as hydraulic cylinders 112 are retracted, gooseneck 44 is lowered relative to hitch connector 106.

Figure 10:
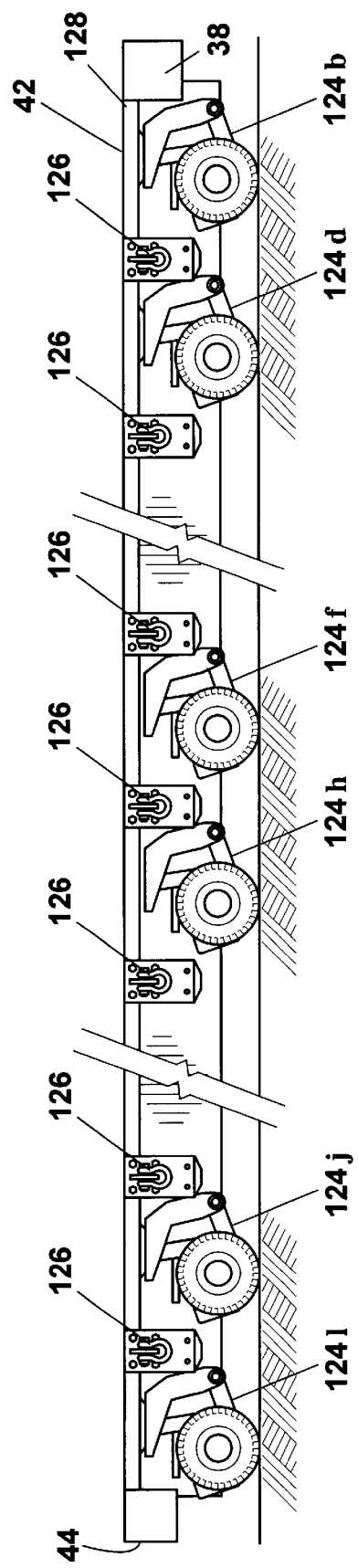
FIG. 10 provides a cutaway side view of the inventive load unit along line 10 of FIG.

Referring to FIG. 10, in the preferred embodiment, load unit 42 is a platform trailer comprising: deck 122 for supporting a cargo; a plurality of steerable wheel assemblies 124 supported from the bottom of deck 122; and a plurality of tie down brackets 126 placed at intervals along the longitudinal edges 128 of deck 122. While the preferred embodiment of the inventive load unit is shown as having six wheel assemblies 124 along each side 128, it should be noted that the invention is not so limited. In fact, in the preferred embodiment, each wheel assembly 124 is removable and, furthermore, referring to FIG. 1, additional wheel assemblies may be added at stations 130, 132, 134, and 136. Therefore, the load unit, as depicted, could accommodate ten wheel assemblies 124 along each side 128, however, this feature would typically be used to group axles into single axles, tandem groups (as depicted), triple groups, or quad groups. As best seen in FIGS. 2 and 3, in the preferred embodiment two wheel assemblies are located side-by-side to create an eight-wheel line.

It should also be noted that multiple load units 42 may be ganged, either in tandem, side-by-side (for double lane movement), or both to increase the cargo area as necessary or to increase the number of axles as may be necessary to accommodate a particular weight. For example, in such a configuration, four wheel assemblies 124 would be placed in a side-by-side configuration such that each line would incorporate sixteen wheels.

In addition, load unit 42 may be separated at roughly its center and a low bed unit (not shown) attached for accommodating loads where the overall height of the loaded trailer 30 is of concern.

Referring to FIGS. 5–7, and 15, each wheel assembly 124 preferably provides four wheels 140, rotatably secured to axle 142. Axle 142 is suspended from turntable 144 by lower arm 146 pivotally attached to upper arm 148. Suspension of axle 142 from turntable 144 is controlled by hydraulic cylinder 150. It can be seen that axle 124 will undergo vertical movement in response to extension or retraction of cylinder 150.

Outer ring 152 of wheel assembly 124 includes apertures 154 for attachment to load unit 42 with bolts or other suitable fastener. Turntable 144 is rotatably secured within ring 152 such that extension or retraction of cylinder 156 will move arm 158, resulting in rotation of turntable 144, and thereby steering wheels 140. Such steerable wheel assemblies are known in the art, as are load units incorporating such steerable wheel units. Furthermore, mechanisms to automatically actuate hydraulic cylinder 156 in response to rotation of a fifth wheel hitch are also known in the art.

Figure 16:
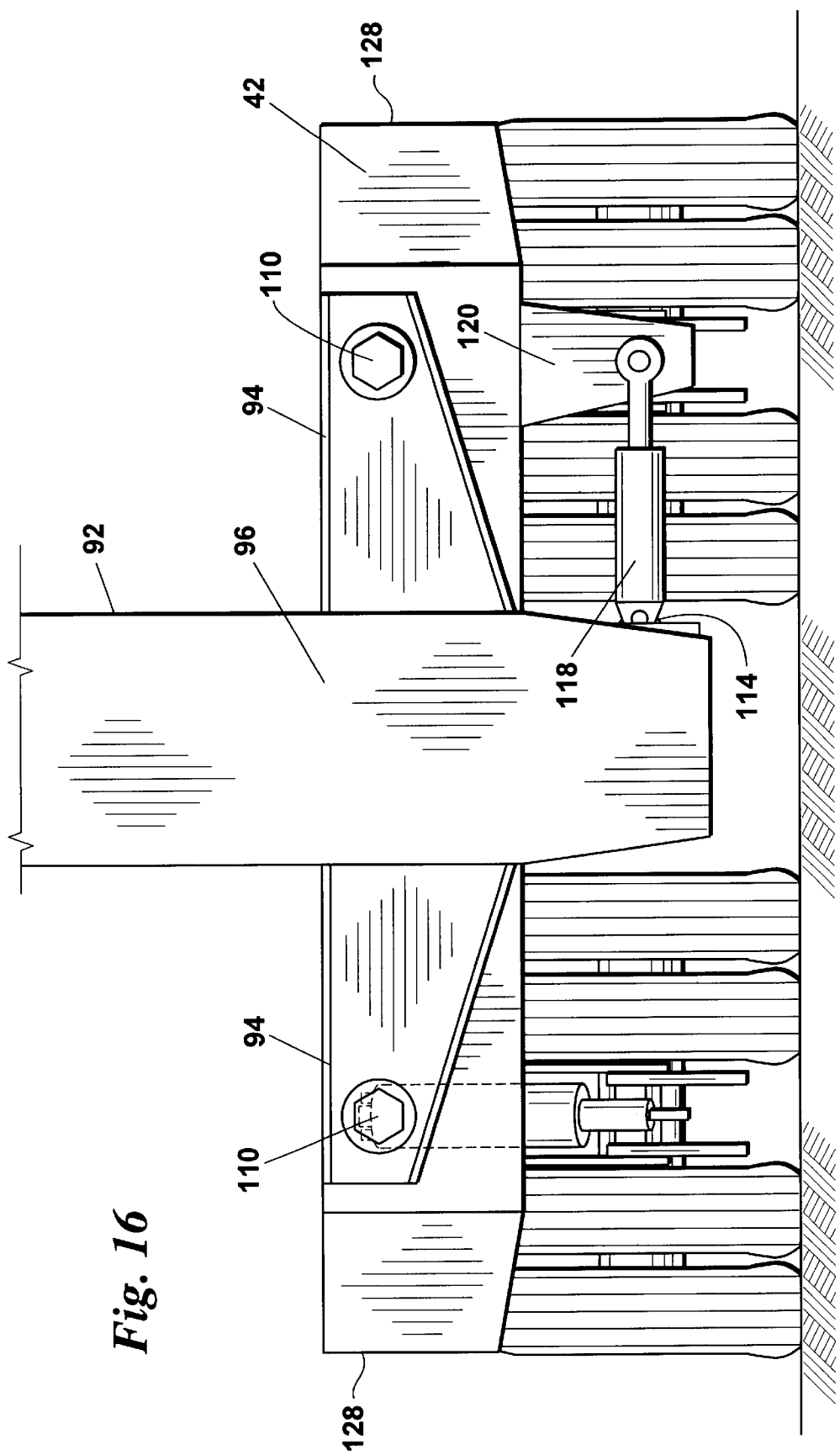
FIG. 16 provides a front view of a lead unit as employed in the inventive trailer.

Referring once again to FIG. 10, load unit 42 is disposed between front gooseneck 38 and rear gooseneck 44. As best seen in FIG. 16, each gooseneck 38 and 44 preferably attaches to load unit 42 with a pair of bolts 110, each bolt 110 passing through an aperture 113 (FIG. 9) in flange 94 for receipt in apertures (not shown) in load unit 42. Each gooseneck 38 and 44 is further secured with pin 114 which is removably inserted in apertures 116 (FIG. 9) in gooseneck 44 by pin puller cylinder 118. Cylinder 118 is supported by member 120 extending downward from deck 122 of load unit 42.

Figure 17:
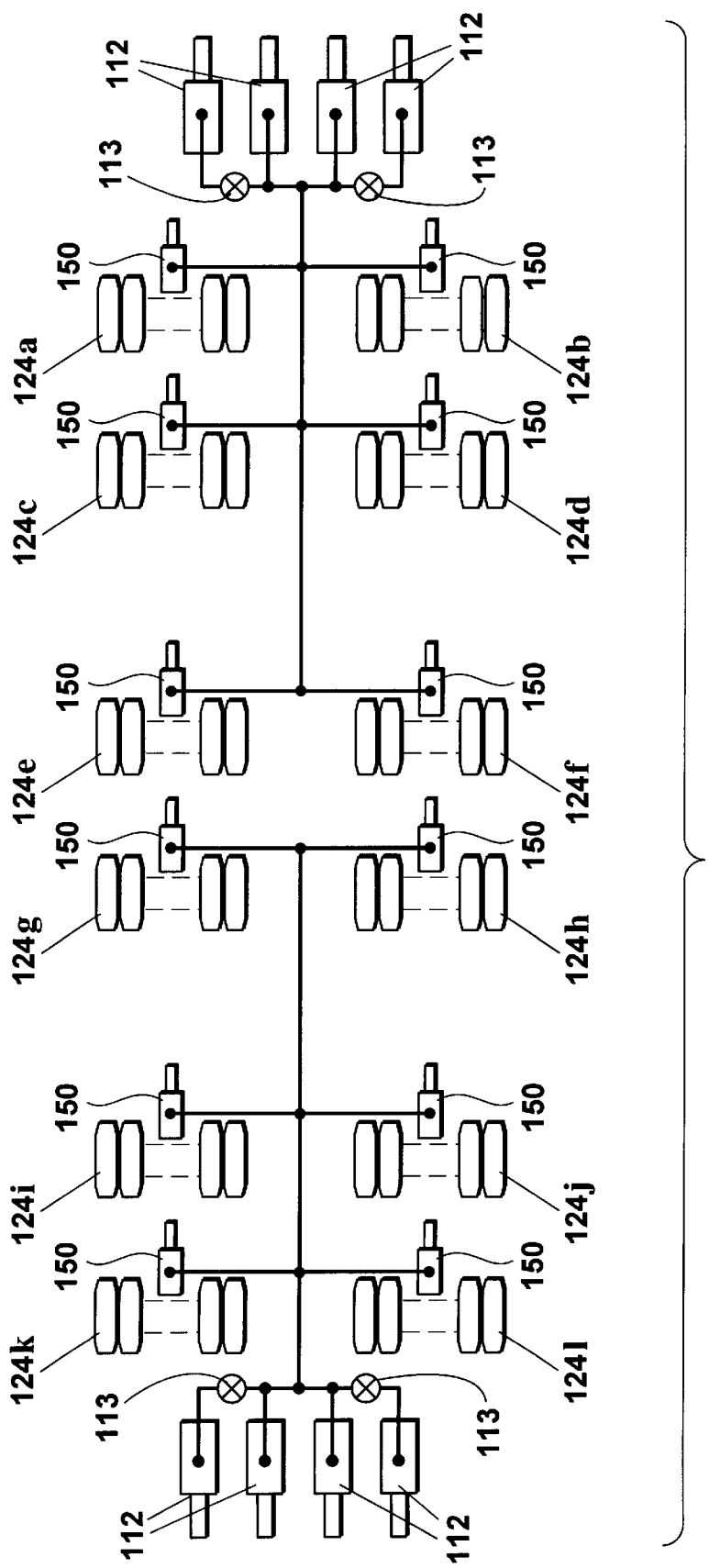
FIG. 17 provides a hydraulic diagram showing interconnection of the suspension cylinders and gooseneck cylinders.

FIG. 17 depicts a hydraulic diagram of the suspension cylinders 150 are interconnected with cylinders 112 in the preferred embodiment.

In practice, the suspension hydraulic cylinders 150 are hydraulically grouped into two groups and all of the cylinders of each group are hydraulically interconnected with conventional hoses or tubing, and fittings. A front group of cylinders 150 is then hydraulically connected to cylinders 112 of front gooseneck 38 and a rear group of cylinders 150 is connected to cylinders 112 of rear gooseneck 44. Thus, cylinders 150 located toward the front of load unit 42 (FIG. 1) are preferably in hydraulic communication with cylinders 112 of the front gooseneck 38 and cylinders 150 located toward the rear of load unit 42 are preferably in hydraulic communication with cylinders 112 on the rear gooseneck 44. As will be understood by those skilled in the art, valves 113 could be provided to select the number of hydraulic cylinders 112 in hydraulic communication with suspension cylinders 150. When hydraulically connected, loads placed on the load unit are proportionately distributed between the wheel assemblies 124 of the load unit 42 and the goosenecks 38 and 44. As depicted in the FIG. 1, the six forward wheel assemblies 124a–f (FIG. 2) would typically be placed in communication with cylinders 112 of front gooseneck 38 and the six rearward wheel assemblies 124g–l would be placed in communication with cylinders 112 of rear gooseneck 44. By way of example, as weight is added to the front of load unit 42, a resulting increase in hydraulic pressure may be read at gauges 66. The increased hydraulic pressure will cause hydraulic cylinders 112 to extend slightly, thereby lifting gooseneck 38 and causing the ratio of the load supported by gooseneck 38 rather than by wheel assemblies 124a–f to remain constant.

Increasing weight towards the rear of load unit 42 would likewise cause cylinders 112 of gooseneck 44 to shift a percentage of the load so added from wheel assemblies 124g–l to gooseneck 44.

By varying the number of cylinders 112 in hydraulic communication with suspension cylinders 150 (i.e., through valves 113, or variations of such valving which would be within the skill level of one of ordinary skill in the art), the ratio of the weight between load unit wheel assemblies 124 and goosenecks 38 and 44 may be readily adjusted. Thus in a jurisdiction which allows greater weight on an eight wheel line (i.e., those under the load unit), a lower percentage of the load weight could be transferred to the gooseneck. If the same load were then transported into a jurisdiction which did not credit greater weight to an eight wheel line than a four wheel line, the hydraulic system could be readily configured to transfer more weight to the front and rear goosenecks and thus distribute more weight to the jeep and dolly axles.

As a result, trailer 30 may be configured for relatively low axle load under the load unit 42 and high fifth wheel loads at the jeep 32 and dolly 46, for relatively high axle load under the load unit 42 and low fifth wheel loads at the jeep 32 and dolly 46, or any point in between, by proper selection of the size and quantity of cylinders 112 on each gooseneck 38 and 44.

In addition, hydraulic power units 58 and 86 may be used to increase or decrease the amount of hydraulic fluid in each suspension system, thereby increasing or decreasing the height of the load unit relative to the ground.

Figure 4:
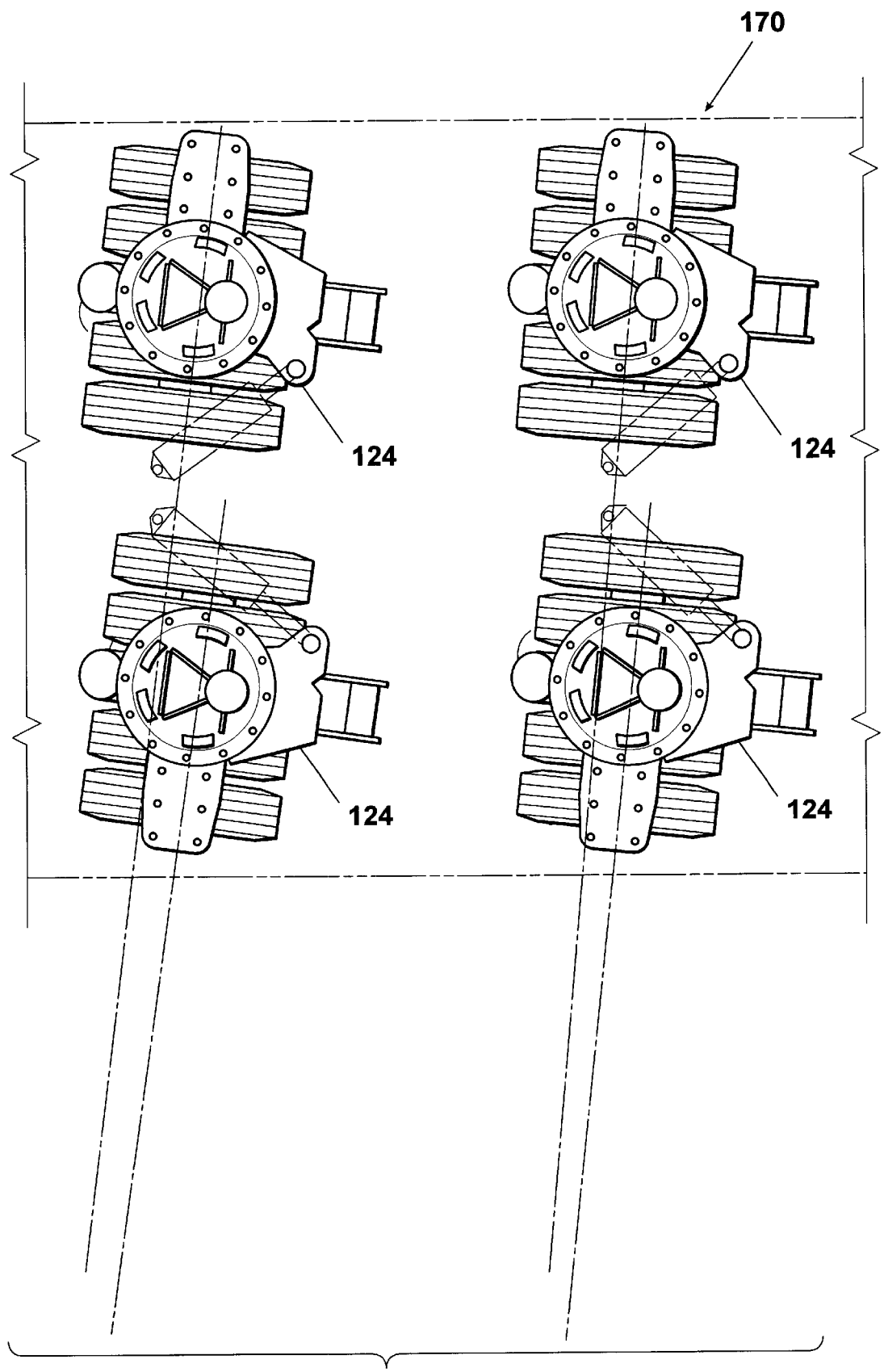
FIG. 4 provides a top cutaway view along circle 4 of FIG. 3 showing four wheel assemblies while the inventive trailer is making a right turn.
Figure 15:
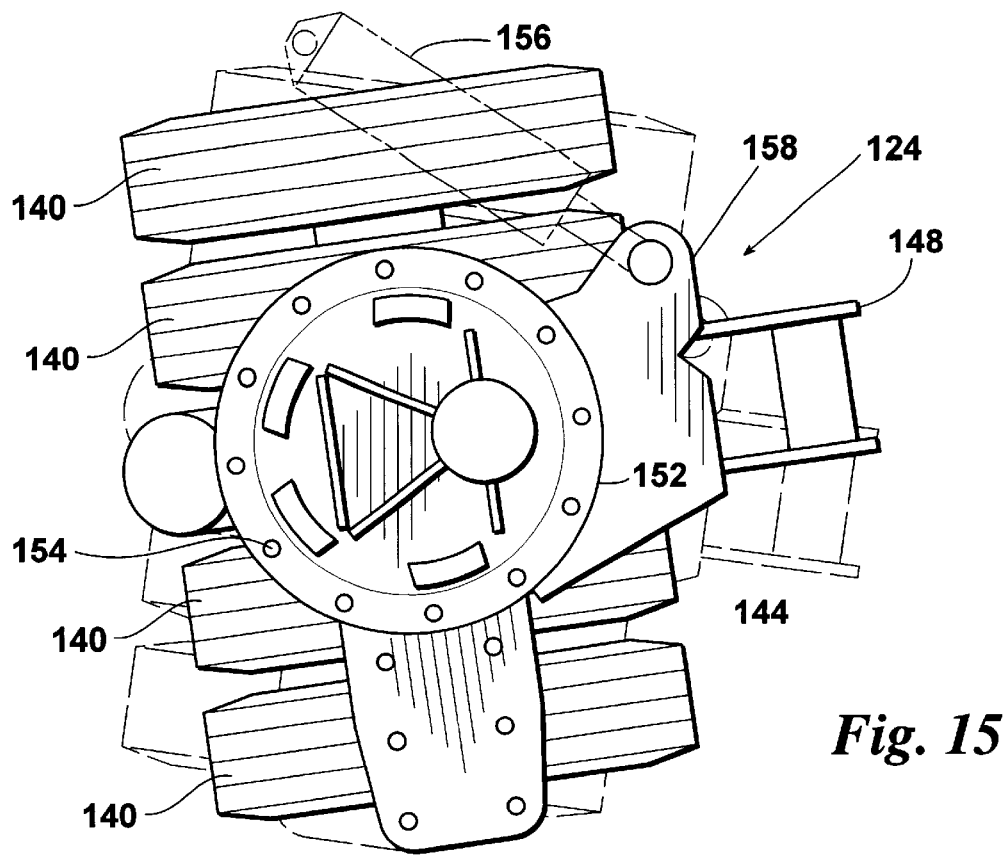
FIG. 15 provides a top view of a wheel assembly incorporated on the inventive load unit during a left turn.
Figure 7:
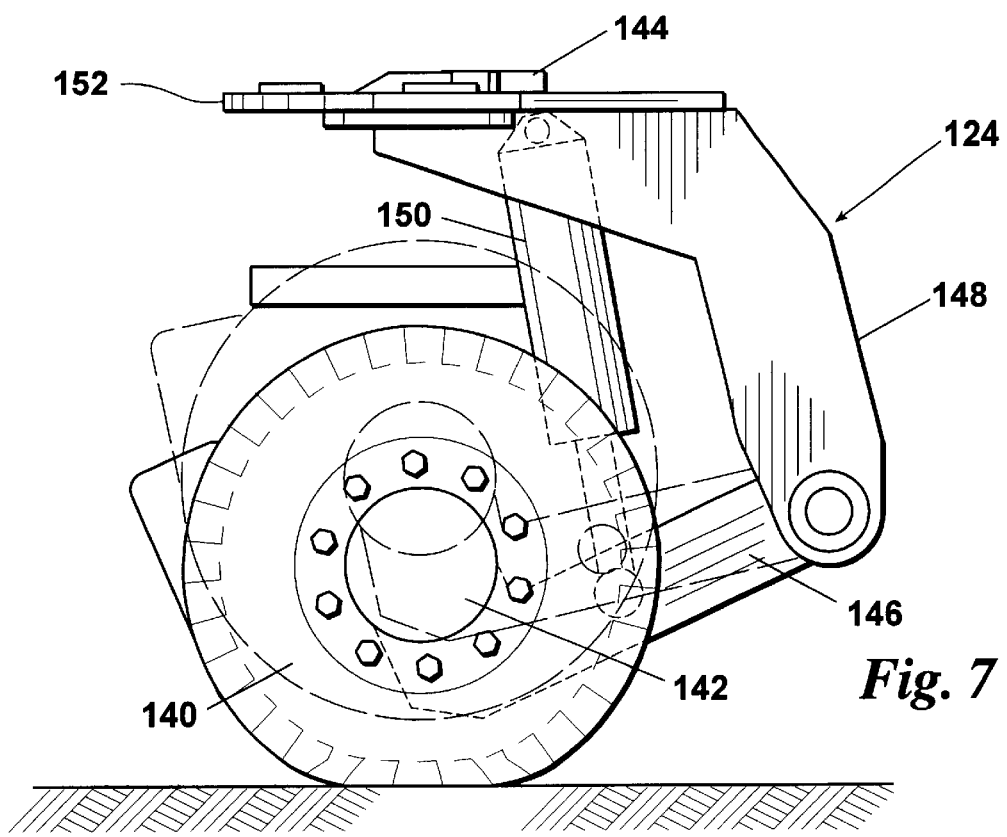
FIG. 7 provides an elevational view of the right side of a wheel assembly as incorporated on the inventive load unit.

Referring to FIGS. 3 and 9, it can be seen that a surprisingly short turning radius may be achieved, particularly in light of the overall length of trailer 30. This is accomplished by the relative large number of pivotal connections and joints, namely: the fifth wheel connection 36 between jeep 32 and tractor 34; the fifth wheel connection 40 between jeep 32 and front gooseneck 38; the fifth wheel connection 48 between rear gooseneck 44 and dolly 46; and the articulated joint 76 of dolly 46, acting in concert with steerable wheel assemblies 124. In addition, it will be apparent to those skilled in the art that steering performance may be maximized for a particular application by the appropriate configuring of steerable wheel assemblies 124. For example, wheel assemblies 124 may be individually configured for varying degrees of hydraulic and mechanical response to a given overall steering angle, for no steering, or for counter-steering (turning the opposite direction). Typically, a given axle group would be configured for uniform steering within that group. For example, a typical configuration is shown in FIGS. 3 and 4 wherein front group 170 is configured for the greatest degree of steering relative to the middle group 172 and rear group 174. Middle group 172 is configured for moderate steering, and rear group 174 is locked straight-ahead for no steering.

Another feature of the inventive apparatus is the ability to lift the load unit with cylinders 112 to a point where wheels 140 no longer touch the ground. Thus, for a return trip, where the load unit is unloaded, wheels 140 may be lifted from the ground to reduce friction and reduce wear and tear on the trailer 30. In this configuration, cylinders 112 would be extended and suspension cylinders 150 would preferably be retracted. Hydraulic power units 58 and 86 are used to provide hydraulic power for such a configuration.

Optionally, tongue 178 (FIG. 1) may be connected between front section 70 and vertical member 92 to ensure proper tracking of dolly 46 behind load unit 42. Tongue 178 precludes any tendency of dolly 46 to caster about fifth wheel 48, particularly at highway speeds.

Configurability is a key aspect of the present invention. By way of example and not limitation, while the preferred embodiment has been primarily discussed with respect to single lane operation, trailer 30 may also be configured for double lane operation. In a minimal double lane configuration two load units 42 would be connected for side-by-side operation. For exceptionally heavy loads, axles 50, 72, and 82 could be provided with 12 or 16 wheel lines in a double lane configuration for further increasing load handling capability. Such configurations are within the scope of the invention.

While a number of configurations of inventive trailer 30 are possible for use on roadways, the inventive trailer 30 is additionally configurable in a number of embodiments for off-road applications. When hauling the types of load envisioned by the inventor, there is often a need to carry the load some distance over unconventional roadways or, at least, private roadways. In such situations, regulations limiting maximum weight per axle are no longer of concern, and accordingly, the inventive trailer 30 may be configured to balance. maneuverability requirements against remaining weight distribution concerns. Some improvement in maneuverability may be gained by simply manually steering the dolly 46. Further improvement in maneuverability may be gained by removing the rear gooseneck 44 and dolly 46 to reduce the overall length. Even greater improvements in maneuverability may be gained by removing the front jeep 32 and attaching the front gooseneck 38 directly to the tractor fifth wheel 36. Finally, extension 98 may be removed from gooseneck 38 and the outboard beam 100 connected directly to the vertical section 92 to fully minimize the length of trailer 30.

It will be understood by those skilled in the art that, while the preferred embodiment has been discussed with reference to identical front and rear goosenecks, the invention is not so limited. By way of example and not limitation, the horizontal portion of the rear gooseneck could be formed as a unitary structure, without the extension, or, by way of further example, the lengths or heights of the front and rear goosenecks could vary.

It will be further understood by those skilled in the art that, by selecting hydraulic cylinders of appropriate diameter, the ratio of load shifted from wheel assemblies 124 to goosenecks 38 and 44 may be selected. Furthermore, while the preferred embodiment has been depicted with four cylinders 112 on each gooseneck 38 and 44, the invention is not so limited. It will be apparent to those skilled in the art that the ratio of load carried by a gooseneck is determined by the total area of the pistons of involved in lifting gooseneck 38 and 44. Therefore, a virtually any ratio may be achieved by the appropriate selection of cylinders 112.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A trailer for hauling large, heavy loads comprising:
   a jeep including:
   a first connector for connecting said jeep to a hitch on a tractor;
   a first hitch for releasably receiving a connector;
   a dolly, said dolly including a second hitch for releasably receiving a connector;
   a load unit including:
   a front gooseneck and a rear gooseneck, each of said front and rear goosenecks including:
   a gooseneck connector for releasable connection to a hitch;

substantially vertical member;

a beam attached between said vertical member and said gooseneck connector; and a hydraulic cylinder operably connected between said beam and said gooseneck connector wherein the relative height between said beam and said gooseneck connector varies in response to extension or retraction of said hydraulic cylinder; and a plurality of wheel assemblies wherein each of said wheel assemblies includes a suspension cylinder in fluid communication with said hydraulic cylinder such that a load applied to said load unit will apply a force to said suspension cylinder and a portion of said force will be communicated to said hydraulic cylinder.

2. The trailer of claim 1 wherein said each of said wheel assemblies is configurable for steering.

3. The trailer of claim 1 wherein said dolly further includes:

a front section;

a rear section; and a pivotal joint connecting said front section to said rear section.

4. The trailer of claim 1 wherein said trailer further comprises a hydraulic power unit, said hydraulic power unit being in fluid communication with said hydraulic cylinder and said suspension cylinders such that said load unit may be selectively raised or lowered.

5. The trailer of claim 1 wherein said load unit further comprises a plurality of axles configurable into a plurality of axle groups.

6. The trailer of claim 5 wherein each of said axle groups comprise two axles in a tandem configuration.

7. A removable gooseneck for use on a load unit composing:

a substantially vertical member having an upper end and a lower end;

a connector for removably attaching the gooseneck to a fifth wheel hitch, said connector being displaced a horizontal distance from said member;

a substantially horizontal beam connected between said upper end and said connector such that said beam is movable relative to one of said member and said connector, a hydraulic cylinder operably affixed to said beam and one of said connector and said member such that said beam will move relative to one of said member and said connector in response to extension or retraction of said hydraulic cylinder; and a flange connected to said lower end, said flange including a plurality of apertures for attaching the gooseneck to the load unit.

8. The removable gooseneck of claim 7 further comprising an extension removably connected to said beam wherein said extension increases said horizontal distance between said member and said connector.

9. A double gooseneck trailer with an improved turning radius comprising:

a jeep having a first hitch;

a dolly including:

a second hitch;

a front section;

a second section; and an articulated joint connecting said front section to said second section; and a load unit including:

a front removable gooseneck having a first connector for releasable attachment to said first hitch; and a second removable gooseneck having a second connector for releasable attachment to said second hitch.

10. The double gooseneck trailer of claim 9 wherein said load unit further includes a plurality of steerable wheel units.

11. The double gooseneck trailer of claim 9 wherein said jeep includes a third connector for releasably attaching said front jeep to a tractor.

12. A configurable trailer having an on-road configuration and an off-road configuration:

a load unit including:

a bed for carrying a payload;

a removable front gooseneck having a first connector thereon;

a removable rear gooseneck having a second connector thereon; and a plurality of steerable wheel assemblies received under said load unit;

a jeep, said jeep including:

a third connector for releasable attachment to a tractor;

a first hitch for releasably receiving said first connector to attach said load unit to said jeep; and a jeep axle; and a dolly, said dolly including:

a second hitch for releasably receiving said second connector to attach said load unit to said dolly; and a plurality of dolly axles; and wherein, to configure said trailer in the on-road configuration, said first connector is removably received in said first hitch to connect said load unit to said jeep and said second connector is removably received in said second hitch to connect said load unit to said dolly, and to convert the trailer from the on-road configuration to the off-road configuration, said removable rear gooseneck is removed from said load unit such that said dolly is not attached to said load unit.

13. The configurable trailer of claim 12, wherein the off-road configuration is a first off-road configuration and the trailer is further includes a second off-road configuration wherein, to convert the trailer from the first off-road configuration to the second off-road configuration, said first connector is removed from said first hitch and said first connector is instead connected to the hitch of a tractor such that said load unit is connected directly to the tractor and not connected to said jeep.

* * * * *